US012207046B2

(12) United States Patent
Oh et al.

(10) Patent No.: US 12,207,046 B2
(45) Date of Patent: Jan. 21, 2025

(54) MICROSPEAKER ENCLOSURE INCLUDING BLOCK FORMED OF POROUS PARTICLES

(71) Applicant: EM-TECH Co., Ltd., Gyeongsangnam-do (KR)

(72) Inventors: Yong Hee Oh, Gyeongsangnam-do (KR); Jae Hwa Lim, Gyeongsangnam-do (KR)

(73) Assignee: EM-TECH Co., Ltd., Gyeongsangnam-do (KR)

( * ) Notice: Subject to any disclaimer, the term of this patent is extended or adjusted under 35 U.S.C. 154(b) by 102 days.

(21) Appl. No.: 17/869,404

(22) Filed: Jul. 20, 2022

(65) Prior Publication Data

US 2023/0023601 A1 Jan. 26, 2023

(30) Foreign Application Priority Data

Jul. 21, 2021 (KR) ........................ 10-2021-0095801
Dec. 16, 2021 (KR) ........................ 10-2021-0180617

(51) Int. Cl.
*H04R 1/28* (2006.01)

(52) U.S. Cl.
CPC .................................. *H04R 1/2876* (2013.01)

(58) Field of Classification Search
CPC .......................... H04R 1/2876; H04R 2499/11
USPC ......................... 381/116–117, 345, 354, 190
See application file for complete search history.

(56) References Cited

U.S. PATENT DOCUMENTS

| | | | | |
|---|---|---|---|---|
| 4,112,168 | A * | 9/1978 | Schafft | B32B 5/08 428/319.3 |
| 11,665,466 | B2 * | 5/2023 | Kang | H04R 1/2811 381/353 |
| 2016/0301998 | A1 * | 10/2016 | Abe | H04R 1/086 |
| 2019/0058935 | A1 | 2/2019 | Lembacher et al. | |
| 2019/0200116 | A1 * | 6/2019 | Lembacher | H04R 1/2807 |
| 2020/0152165 | A1 | 5/2020 | Gavryushin et al. | |
| 2021/0144465 | A1 * | 5/2021 | Sauer | H04R 1/288 |

FOREIGN PATENT DOCUMENTS

| | | | |
|---|---|---|---|
| JP | H0371796 | A | 3/1991 |
| JP | 2012222673 | A | 11/2012 |
| KR | 1020070119648 | A | 12/2007 |
| KR | 20200004998 | A | 1/2020 |
| KR | 20210015556 | A | 2/2021 |
| KR | 20210057692 | A | 5/2021 |
| WO | 2020109794 | A1 | 6/2020 |

* cited by examiner

*Primary Examiner* — George C Monikang
(74) *Attorney, Agent, or Firm* — Murphy, Bilak & Homiller, PLLC

(57) ABSTRACT

The present disclosure provides a microspeaker enclosure including a block formed of a porous material. The microspeaker enclosure including a block formed of a porous material includes a microspeaker, an enclosure case in which the microspeaker is mounted, the enclosure case including a back volume communicating with the microspeaker, a porous block installed in the back volume, having 3-nm pores having air adsorption performance and 6-nm pores serving as a passage for air circulation in a predetermined ratio, and including porous particles combined as a block, and a film attached to one surface of the porous block.

9 Claims, 10 Drawing Sheets

MICROSPEAKER ENCLOSURE INCLUDING BLOCK FORMED OF POROUS PARTICLES

TECHNICAL FIELD

The present disclosure relates to a microspeaker enclosure including a block formed of a porous material.

BACKGROUND

A microspeaker is provided in a portable device, etc. to generate sound. With recent developments of mobile devices, the microspeaker has been used for various devices. In particular, the latest mobile device tends to have a light weight, small size, and slim shape to facilitate portability, and accordingly, the microspeaker mounted in the mobile device is required to have a small size and slim shape.

However, in the case of a microspeaker having a small size and slim shape, an area of a diaphragm decreases, and a size of a resonance space in which the sound generated by vibration of the diaphragm is resonated and amplified also decreases, as a result of which a sound pressure level (SPL) decreases. Such decrease in the sound pressure level is particularly pronounced at low frequencies. There has been developed a technology of improving a low frequency sound pressure level and reducing total harmonic distortion (THD) by arranging an air adsorbent, which is a porous material, in a resonance space, so that the air adsorbent adsorbs air molecules and defines a virtual acoustic space, to enhance a low frequency sound pressure level.

FIG. 1 is a view illustrating a microspeaker enclosure filled with a porous material according to the related art. According to the related art, a microspeaker 1 is mounted on enclosure cases 2 and 3, and a back volume 4 is provided between the upper and lower enclosure cases 2 and 3. The back volume 4 communicates with a back hole of the microspeaker 1 and is filled with porous particles 5. As the porous particles 5 adsorb air molecules, a virtual acoustic space is formed, thus achieving an effect of expanding the back volume 4.

However, the microspeaker enclosure filled with a porous material according to the related art has a disadvantage in that noise occurs when the microspeaker 1 generates a sound or the porous particles 5 vibrate due to an impact applied to the enclosure.

In order to solve the disadvantage, there have been disclosed technologies of making porous particles a block and installing the block in an enclosure. However, if the porous particles are formed as a block, air may not be circulated to the particles located inside the porous particle block, and thus, the performance of absorption of air may gradually decrease as the size of the block increases.

In addition, when attaching a porous particle block 10 to an enclosure 30 as in FIG. 2, a bond 20 may penetrate into the porous particle block 10 to degrade the air adsorption performance of the porous particles.

SUMMARY

An object of the present disclosure is to provide a microspeaker enclosure including a porous block, which does not reduce an air adsorption rate and an air circulation rate of porous particles, while forming the porous particles as a block.

According to an aspect of the present disclosure for achieving the above objects, there is provided a microspeaker enclosure including a block formed of a porous material including: a microspeaker, an enclosure case in which the microspeaker is mounted, the enclosure case including a back volume communicating with the microspeaker, a porous block installed in the back volume, having 3-nm pores having air adsorption performance and 6-nm pores serving as a passage for air circulation in a predetermined ratio, and including porous particles combined as a block, and a film attached to one surface of the porous block.

In another embodiment of the present disclosure, there is provided a microspeaker enclosure including a block formed of a porous material, in which the porous block and the film may be attached by a tape having an adhesive component.

In another embodiment of the present disclosure, there is provided a microspeaker enclosure including a block formed of a porous material, in which the film and the tape attached to the porous block may have one or more holes.

In another embodiment of the present disclosure, there is provided a microspeaker enclosure including a block formed of a porous material, in which the porous block to which the film is attached may be attached to the enclosure by a bond or a tape.

In another embodiment of the present disclosure, there is provided a microspeaker enclosure including a block formed of a porous material, in which the porous block to which the film is attached may be mounted in the enclosure, rather than being attached to the enclosure.

In another embodiment of the present disclosure, there is provided a microspeaker enclosure including a block formed of a porous material, in which the first porous particles may include any one or more of zeolite, activated carbon, and MOFs.

In another embodiment of the present disclosure, there is provided a microspeaker enclosure including a block formed of a porous material, in which the second porous particles may include any one or more of aerogel, porous silica, and MOFs.

In another embodiment of the present disclosure, there is provided a microspeaker enclosure including a block formed of a porous material, in which the porous block may include a binder for binding the first porous particles and the second porous particles.

In another embodiment of the present disclosure, there is provided a microspeaker enclosure including a block formed of a porous material, in which the porous block may be in a shape in which a tape or film is attached to a surface thereof together.

In another embodiment of the present disclosure, there is provided a microspeaker enclosure including a block formed of a porous material, in which the porous block may have a reinforcing material provided therein.

In another embodiment of the present disclosure, there is provided a microspeaker enclosure including a block formed of a porous material, in which at least one porous block may be disposed in the resonance space.

In the microspeaker enclosure including a block formed of a porous material provided in the present disclosure, since a film is installed on one surface of the porous block, a bond is prevented from penetrating into the porous block when the porous block is installed in the enclosure, thereby preventing a degradation of air adsorption power and air circulation due to the bond.

In addition, in the microspeaker enclosure including a block formed of a porous material provided in the present disclosure, the porous block including both pores having a first size having a high nitrogen and oxygen adsorption power and pores having a second size serving as an air circulation passage is manufactured, so that the porous material may be formed as a block, without degrading the air adsorption power of porous particles.

DETAILED DESCRIPTION

Hereinafter, the present disclosure will be described in more detail with reference to the drawings.

Figure 1:
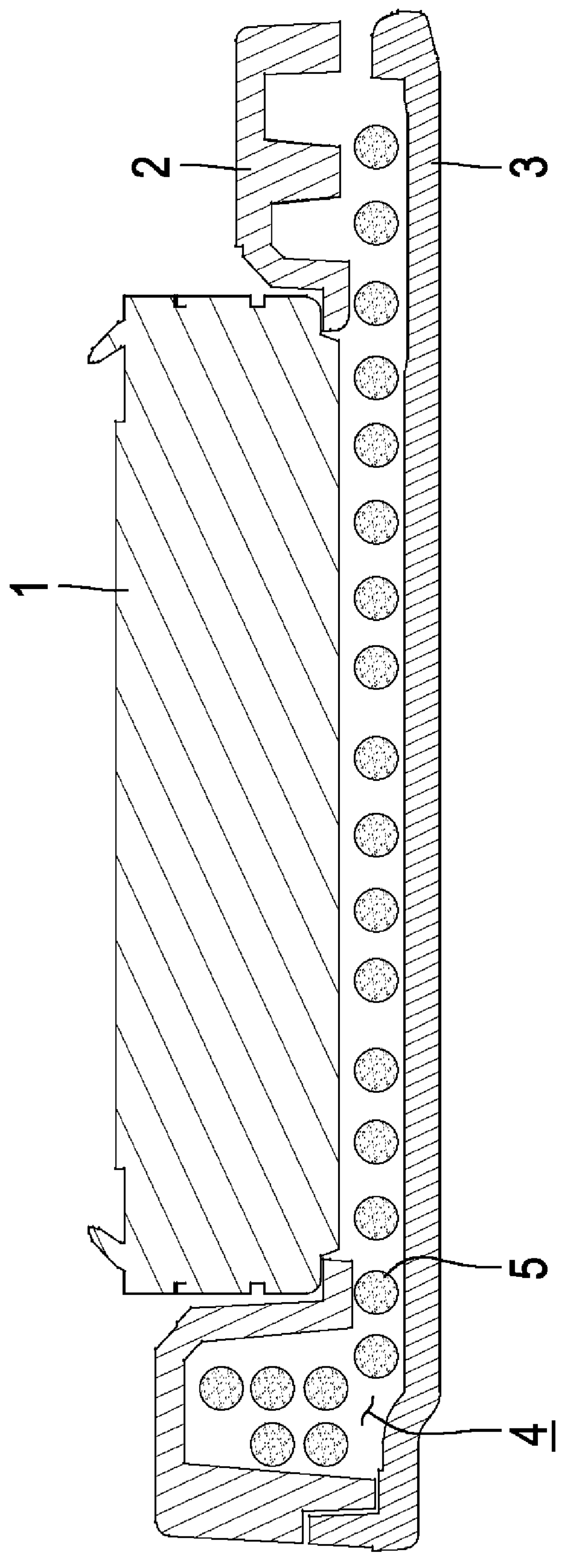
FIG. 1 is a view illustrating a microspeaker enclosure filled with a porous material according to the related art.
Figure 2:
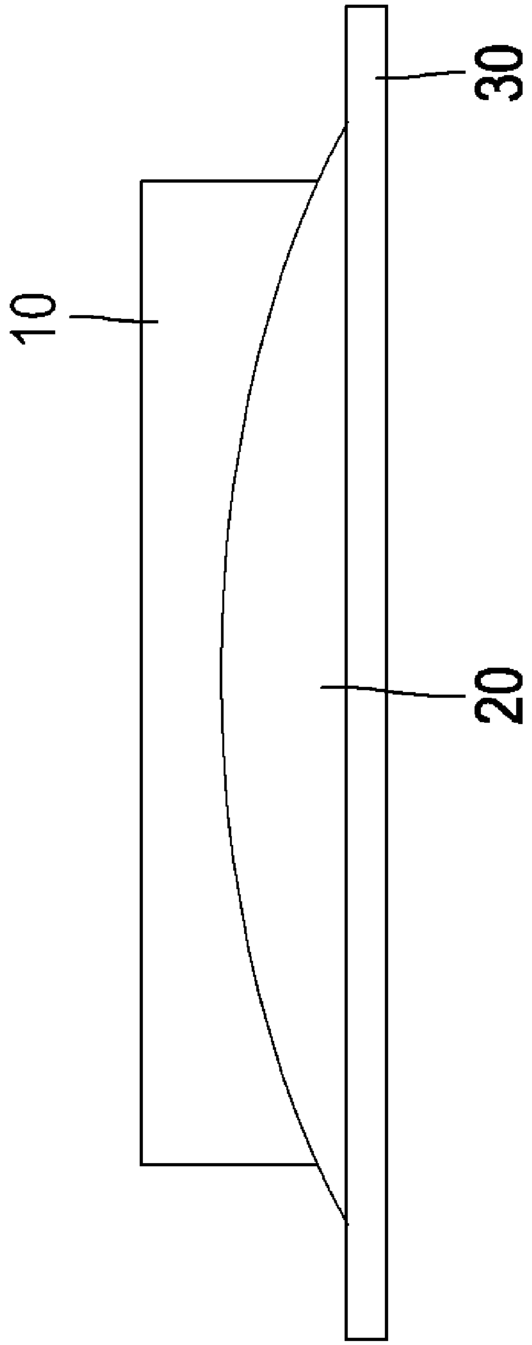
FIG. 2 is a view illustrating a state in which a block formed of a porous material is attached to a microspeaker enclosure according to the related art.
Figure 3:
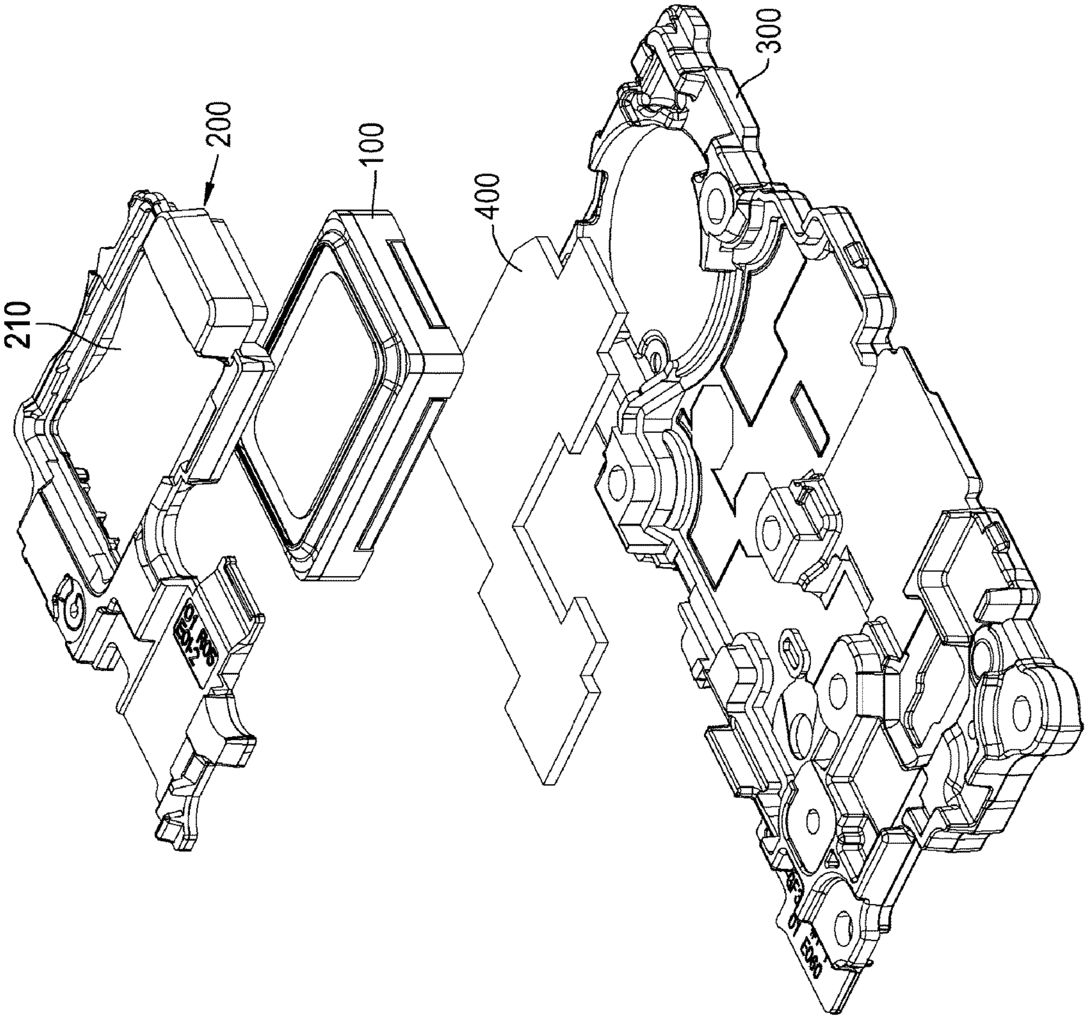
FIG. 3 is an exploded view of a microspeaker enclosure including a block formed of a porous material according to a first embodiment of the present disclosure.
Figure 4:
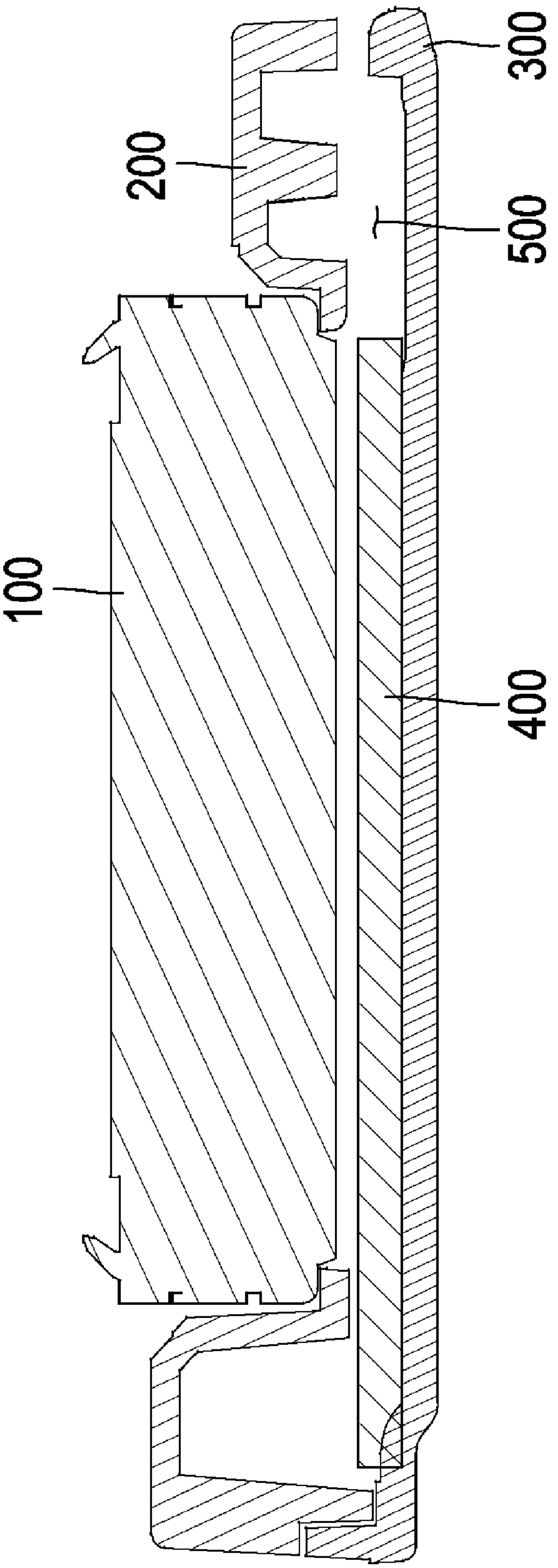
FIG. 4 is a cross-sectional view of a microspeaker enclosure including a block formed of a porous material according to the first embodiment of the present disclosure.

FIG. 3 is an exploded view of a microspeaker enclosure including a block formed of a porous material according to a first embodiment of the present disclosure, and FIG. 4 is a cross-sectional view of a microspeaker enclosure including a block formed of a porous material according to the first embodiment of the present disclosure.

A microspeaker enclosure including a block formed of a porous material according to the first embodiment of the present disclosure includes a microspeaker 100, enclosure cases 200 and 300, and a porous block 400. The enclosure cases 200 and 300 include an upper enclosure case 200 and a lower enclosure case 300 coupled to form a back volume 500 therein. The upper enclosure case 200 includes a microspeaker accommodation portion 210 so that the microspeaker 100 may be mounted therein. A backhaul (not shown) of the microspeaker 100 communicates with the back volume 500 through the microspeaker accommodation portion 210.

The porous block 400 is installed in the back volume 500 in a state in which porous particles are made into a block. In the porous block 400, a ratio of the volume of 6-nm pores to the volume of 3-nm pores is 0.6 or more. The volume of the 3-nm pores serves to adsorb/desorb nitrogen or oxygen, which accounts for most of the air, and the volume of the 6-nm pores serves as a passage through which air reaches the 3-nm pores in air circulation according to an operating speed of the microspeaker.

The porous block 400 is installed in the back volume 500 in a state in which the porous particles are made into a block. The porous block 400 is formed by mixing first porous particles having a main pore size of 2 to 4 nm and an average pore size of 3 nm and second porous particles having a main pore size of 4 to 8 nm and an average pore size of 6 nm, followed by forming a block. Here, the main pore size of the first porous particles being 2 to 4 nm means that the porous particles may have pores having a size out of the range of 2 to 4 nm, but most of the pores have a size of 2 to 4 nm and an average of the pore sizes is 3 nm. In addition, the main pore size of the second porous particles being 4 to 8 nm means that the porous particles may have pores having a size out of the range of 4 to 8 nm, but most of the pores have a size of 4 to 8 nm and an average of the pore sizes is 6 nm. The first porous particles have excellent adsorption capacity of nitrogen or oxygen, which accounts for most of the air, and the second porous particles having larger pores and a higher porosity than those of the first porous particles help facilitate air circulation.

As the first porous particles, particles having a high adsorption rate of nitrogen or oxygen, such as zeolite, activated carbon, and MOFs used in the related art, are used. The porous particles used to improve acoustic properties by functioning as a virtual back volume are mainly zeolite, and a diameter of zeolite grains up to 300 μm to 500 μm has air adsorption properties that improve acoustic performance. However, although manufactured in the same composition ratio, if the diameter of the zeolite grains is 500 μm or more, the air adsorption properties that improve the acoustic performance start to degrade. The reason why the acoustic performance improvement characteristics are degraded according to the size of the particles is because, air circulation should be made to the inside of the most porous particles that are filled in accordance with an operating speed of the microspeaker but air circulation becomes difficult and the air adsorption performance of porous particles gradually decreases when the diameter of the grains is equal to or greater than 500 μm. In particular, in the case of a block that needs to have a relatively large area, if the block is formed with the same material and ratio as those of the porous grains, the block may not have any capacity to improve acoustic properties at all. To implement this, the air circulation rate should be increased. Through an experiment, it was confirmed that the pores at the level of 6 nm play a role in improving the air circulation rate.

At this time, in order to form a porous block capable of improving acoustic properties, the ratio of the 3-nm pore volume [$cm^3/g$] to the 6-nm pore volume [$cm^3/g$] preferably satisfies the following expression:

$$\frac{6\text{ nm Pore Volume}[cm^3/g]}{3\text{ nm Pore Volume}[cm^3/g]} \geq 0.6$$

Here, the pore volume [$cm^3/g$] is calculated based on the BJH desorption cumulative pore volume.

In addition, a material having adhesion, that is, a binder, may be added to the porous block 400 to form a block by bonding the porous particles to each other. In this case, the porous particles may be one or more types of particles selected from zeolite, activated carbon, MOFs, aerogel, and porous silica. That is, the porous block 400 may be formed by binding one type of porous particles with a binder or may be formed by binding two or more types of porous particles. There is no restriction on the shape of the porous block 400, and the porous block may have various shapes, such as a polyhedron or a shape corresponding to the back volume 500.

Figure 5:
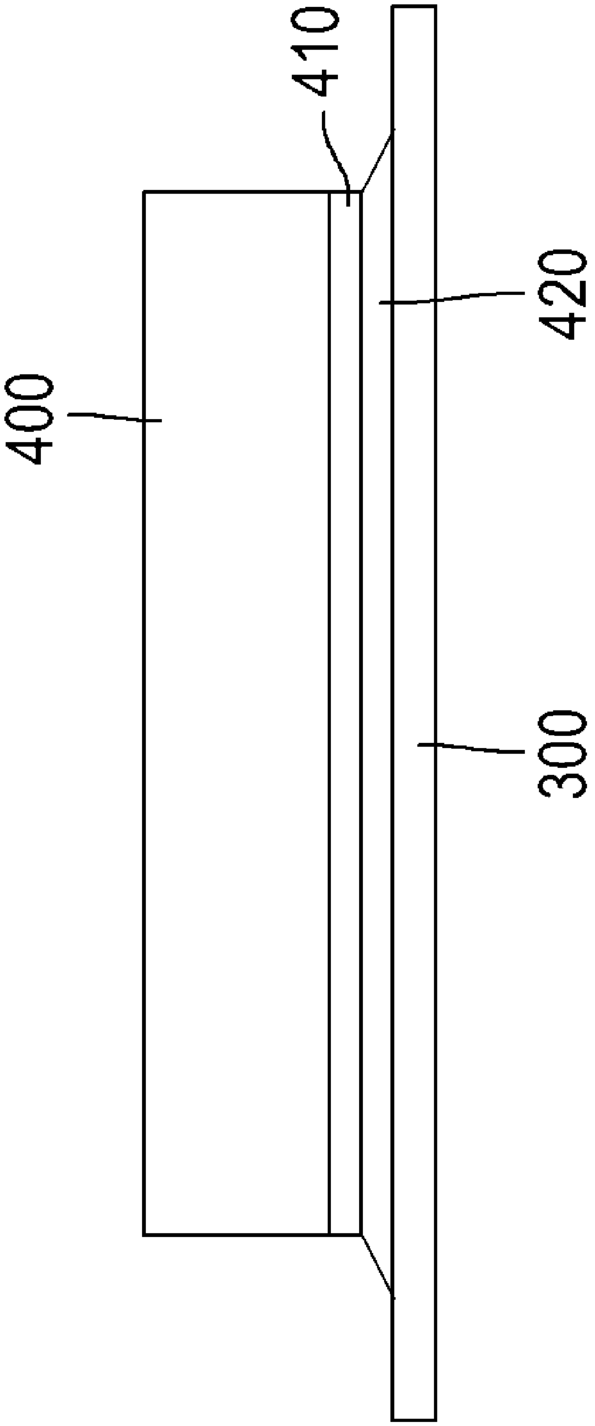
FIG. 5 is a cross-sectional view of a microspeaker enclosure including a block formed of a porous material according to the first embodiment of the present disclosure.

FIG. 5 is a cross-sectional view of a microspeaker enclosure including a block formed of a porous material according to a first embodiment of the present disclosure.

The porous block 400 according to the first embodiment of the present disclosure includes a film 410 attached on a surface facing the enclosure case 300, that is, on a surface attached to the enclosure case 300. When the porous block 400 is attached to the enclosure case 300 using the bond 420, the film 410 may prevent the bond 420 from penetrating into the porous block 400.

Figure 6:
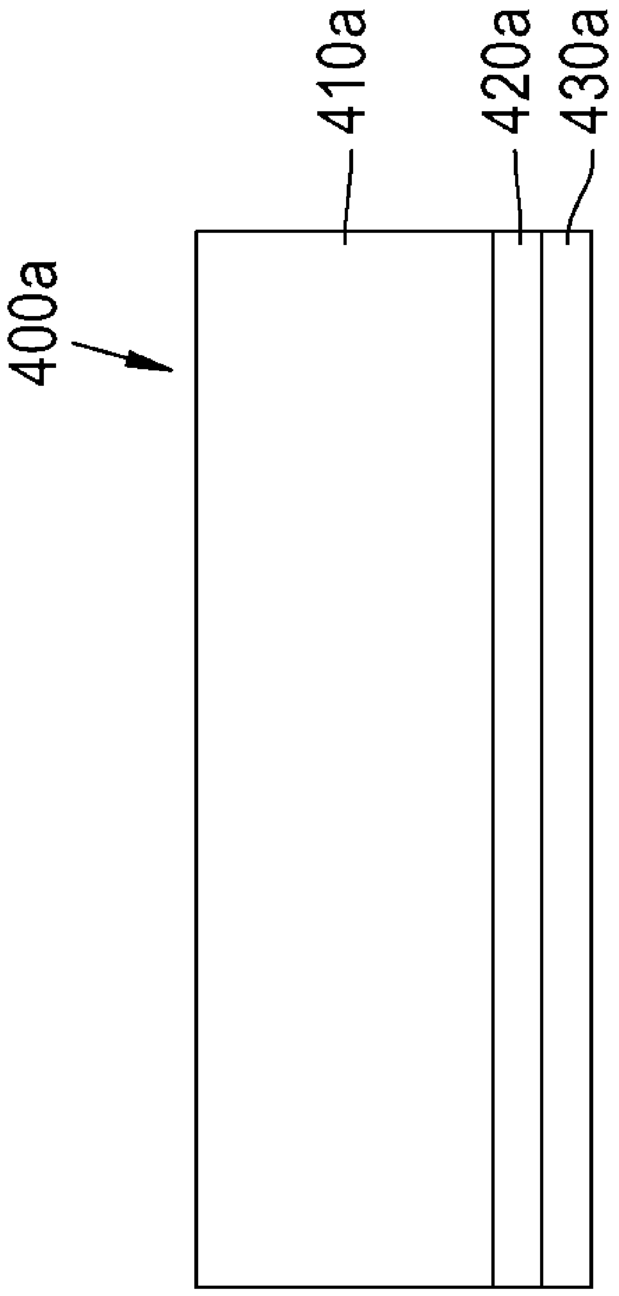
FIG. 6 is a cross-sectional view of a microspeaker enclosure including a block formed of a porous material according to a second embodiment of the present disclosure.

FIG. 6 is a cross-sectional view illustrating an example of a block formed of a porous material according to a second embodiment of the present disclosure.

In order to enhance adhesion, strength or durability and to prevent the bond from penetrating into a porous block 400*a*, a film 430*a* is attached to a porous block body 410*a* of the porous block 400*a*. In this case, only the tape 420*a* may be attached without the film 430*a*.

Figure 7:
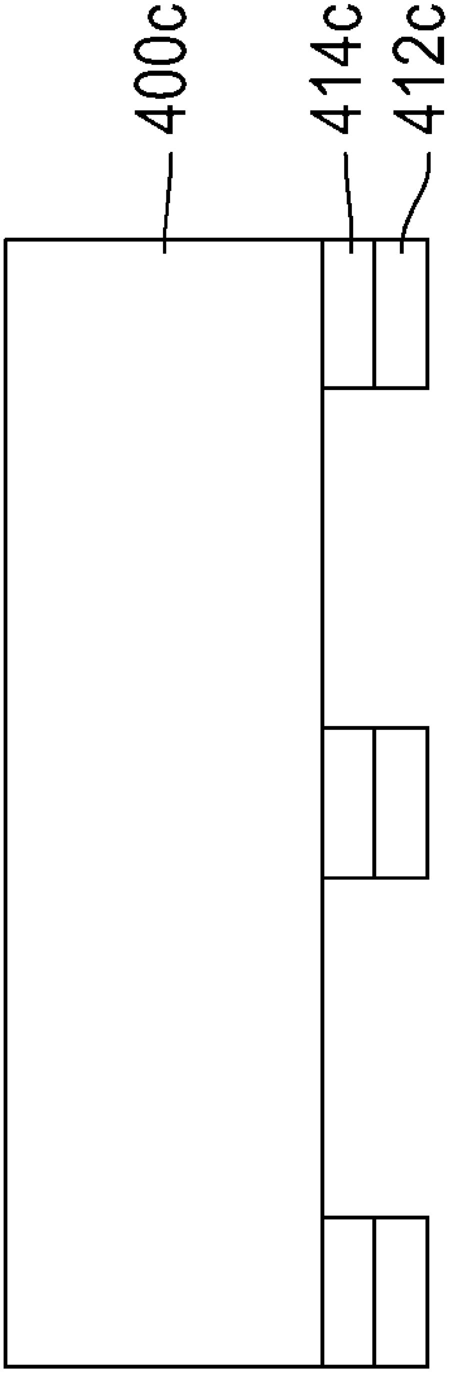
FIG. 7 is a cross-sectional view of a microspeaker enclosure block including a block formed of a porous material according to the second embodiment of the present disclosure.
Figure 8:
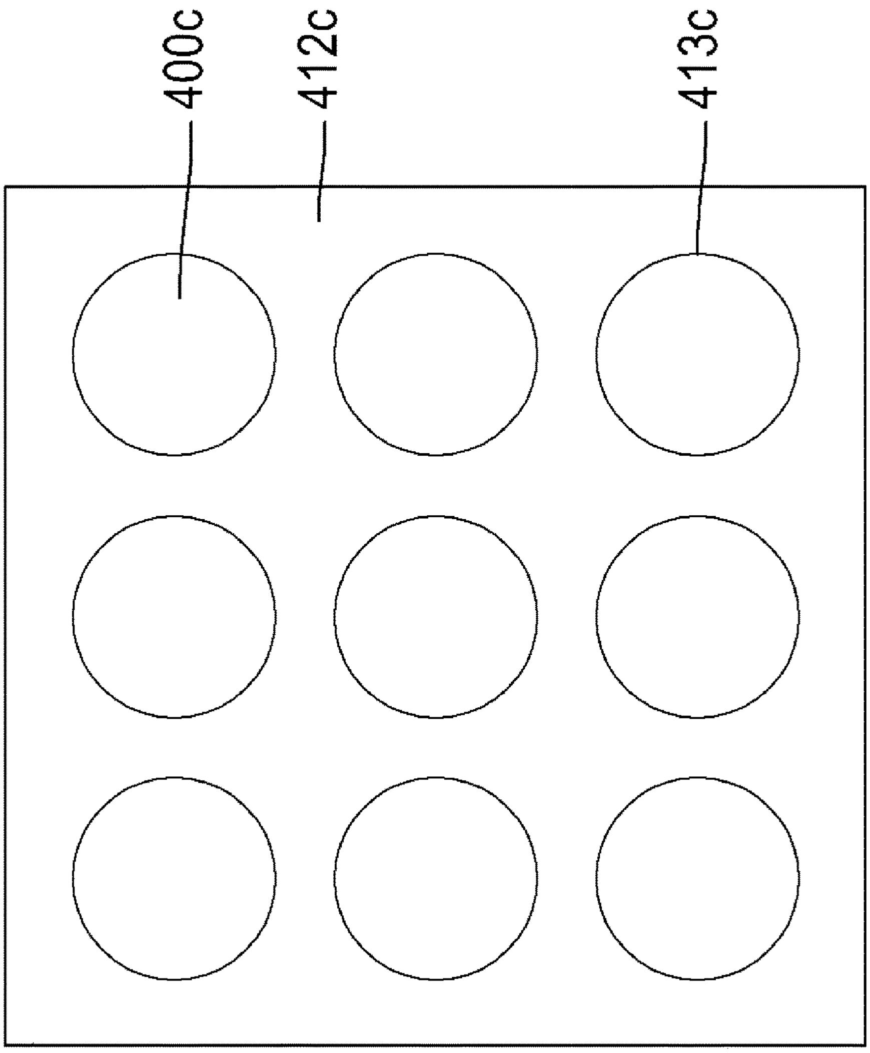
FIG. 8 is a bottom view of a microspeaker enclosure including a block formed of a porous material according to a third embodiment of the present disclosure.

FIG. 7 is a cross-sectional view of a microspeaker enclosure including a block formed of a porous material according to a third embodiment of the present disclosure. FIG. 8 is a bottom view of a microspeaker enclosure including a block formed of a porous material according to the third embodiment of the present disclosure.

A porous block 400*c* according to the third embodiment of the present disclosure includes a film 412*c* on a surface attached to an enclosure case. When the porous block 400*c* is attached to the enclosure case using a bond, the film 412*c* may prevent the bond from penetrating into the porous block 400*c*. In this case, the film 412*c* may have a plurality of fine holes 413*c* to prevent the penetration of the bond, while increasing the air adsorption performance and the air circulation capacity of the porous block 400*c*. Here, it is preferable that holes may be formed in the same position as that formed in the film 412*c* in a tape 414*c* for attaching the film 412*c* to the porous block 400*c*.

Figure 9:
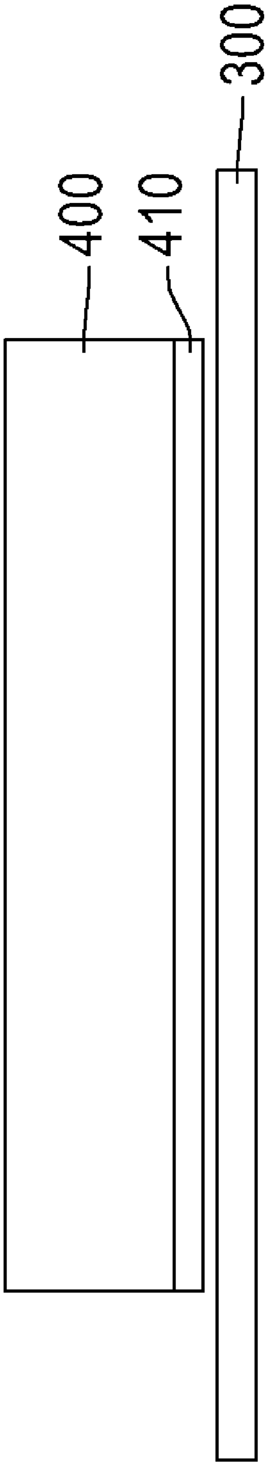
FIG. 9 is a cross-sectional view of a microspeaker enclosure including a block formed of a porous material according to a fourth embodiment of the present disclosure.

FIG. 9 is a cross-sectional view of a microspeaker enclosure including a block formed of a porous material according to a fourth embodiment of the present disclosure.

A block 400 formed of a porous material according to the fourth embodiment of the present disclosure is mounted in the enclosure 300 without being attached to the enclosure 300 by a separate bond. Since the block 400 is not attached by a separate bond, the block 400 may be pressed and fixed in the enclosure 300.

Figure 10:
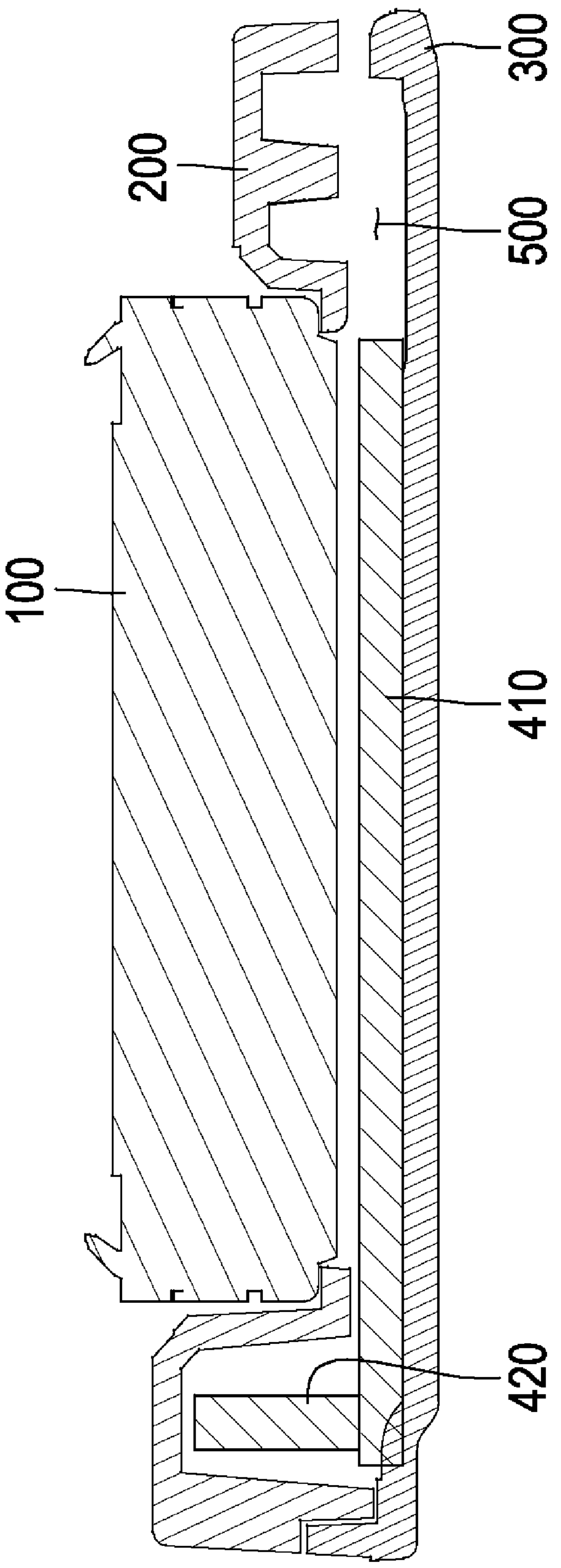
FIG. 10 is a cross-sectional view of a microspeaker enclosure including a block formed of a porous material according to the third embodiment of the present disclosure.

FIG. 10 is a cross-sectional view of a microspeaker enclosure including a block formed of a porous material according to a second embodiment of the present disclosure.

In the microspeaker enclosure including a block formed of a porous material according to the second embodiment of the present disclosure, a first porous block 410 and a second porous block 420 are installed in a back volume 500. That is, two or more porous blocks 410 and 420 may be disposed in the back volume 500.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A microspeaker enclosure including a block formed of a porous material, the microspeaker enclosure comprising:
- a microspeaker;
- an enclosure case in which the microspeaker is mounted, the enclosure case including a back volume communicating with the microspeaker;
- a porous block installed in the back volume and having 3-nm pores having air adsorption performance and 6-nm pores serving as a passage for air, the porous block including first porous particles and second porous particles combined as a block; and
- a film attached to one surface of the porous block,
- wherein the porous block is attached to the enclosure case using a bond and the film prevents the bond from penetrating into the porous block.

2. The microspeaker enclosure of claim 1, wherein the porous block and the film are attached by a tape having an adhesive component.

3. The microspeaker enclosure of claim 2, wherein the film and the tape attached to the porous block have one or more holes.

4. The microspeaker enclosure of claim 1, wherein the first porous particles include zeolite and/or activated carbon and/or MOFs.

5. The microspeaker enclosure of claim 1, wherein the second porous particles include aerogel and/or porous silica and/or MOFs.

6. The microspeaker enclosure of claim 1, wherein the porous block includes a binder for binding the first porous particles and the second porous particles.

7. The microspeaker enclosure of claim 1, wherein the porous block includes a tape or film attached to a porous block body of the porous block.

8. The microspeaker enclosure of claim 1, wherein the porous block comprises a reinforcing material.

9. The microspeaker enclosure of claim 1, wherein at least one porous block is disposed in a resonance space.

* * * * *